(12) United States Patent
Sidorovich et al.

(10) Patent No.: US 6,788,901 B2
(45) Date of Patent: Sep. 7, 2004

(54) METHOD OF FORMING OPTICAL RADIATION BEAMS FOR FREE-SPACE OPTICAL COMMUNICATION SYSTEMS

(75) Inventors: Vladimir G. Sidorovich, Moscow (RU); Aleksei A. Leshev, St.-Petersburg (RU); Valery V. Ragulsky, Moscow (RU); Mikhail V. Vasiliev, St.-Petersburg (RU); Vladimir P. Vasiliev, Moscow (RU)

(73) Assignee: Meklyn Enterprises Limited, Larnaca (CY)

( * ) Notice: Subject to any disclaimer, the term of this patent is extended or adjusted under 35 U.S.C. 154(b) by 585 days.

(21) Appl. No.: 09/847,652

(22) Filed: May 3, 2001

(65) Prior Publication Data

US 2003/0011850 A1 Jan. 16, 2003

(30) Foreign Application Priority Data

Apr. 25, 2001 (RU) .......................................... 2001110963

(51) Int. Cl.[7] .............................................. H04B 10/00
(52) U.S. Cl. ........................... 398/143; 398/88; 398/25; 398/113
(58) Field of Search .................................. 359/238, 172, 359/152, 237, 245, 251, 252, 255; 398/88, 25, 113, 118, 130, 140, 141, 142; 385/1, 2, 28, 33, 73, 74, 89

(56) References Cited

U.S. PATENT DOCUMENTS

| 4,603,421 | A | | 7/1986 | Scifres et al. |
|---|---|---|---|---|
| 4,854,706 | A | * | 8/1989 | Claus et al. ................. 356/477 |
| 4,960,315 | A | | 10/1990 | Kostal et al. |
| 5,062,150 | A | | 10/1991 | Swanson et al. |
| 5,109,443 | A | | 4/1992 | Hill et al. |
| 5,528,407 | A | | 6/1996 | Nakata et al. |
| 5,602,668 | A | | 2/1997 | Kuchta |
| 5,786,923 | A | | 7/1998 | Doucet et al. |
| 6,249,381 | B1 | * | 6/2001 | Suganuma .................. 359/618 |
| 6,366,723 | B1 | | 4/2002 | Medved et al. |
| H2045 | H | * | 9/2002 | Busse et al. .................. 385/31 |
| 6,510,265 | B1 | * | 1/2003 | Giaretta et al. ............... 385/38 |

FOREIGN PATENT DOCUMENTS

WO   WO 00/04653   6/1999

OTHER PUBLICATIONS

"Frequency correlation function of modal noise in multi-mode optical fibers," Ohtsubo, J.; Kourogi, M.; Lightwave Technology, Journal of , vol.: 7 , Issue: 9 , Sep. 1989 pp.: 1300–1307.*

"Speckle Noise Reduction in Fiber Optic Analog Video Transmission Using Semiconductor Laser Diodes," Sato, K.; Asatani, K.; Communications, IEEE Transactions on [legacy, pre—1988], vol.: 29 , Issue: 7 , Jul. 1981 pp.: 1017–1024.*

"Angular speckle correlations and speckle removal in multimode fiber laser delivery" Moon, J.A.; Busse, L.E.; Aggarwal, I.D.; CLEO '96., Summaries of papers presented at the Conference on , Jun. 2–7, 1996 pp.: 291–292.*

(List continued on next page.)

*Primary Examiner*—Jason Chan
*Assistant Examiner*—David Payne
(74) *Attorney, Agent, or Firm*—McDermott, Will & Emery (57) ABSTRACT

The inventive beam forming technique enables use of multimode optical fibers to couple a modulated optical beam from a radiation source to an optical emitting antenna, for free-space communications. The disclosure teaches a methodology for determining the angular and frequency spectrum parameters of the optical energy applied to the fiber as well as the parameters of the fiber so as to smooth speckle-pattern caused by multimode interference and to provide a speckle-pattern contrast at or below a maximum value at which free-space communication is most efficient.

11 Claims, 2 Drawing Sheets

OTHER PUBLICATIONS

Jens Kissing, et al., "*A robust and flexible all optical CDMA multichannel transmission system for the access domain*", TuV2–1–TuV2–3.

P.F. Szajowski, et al., "*Eight–channel Video Broadcast Feed Service using Free–Space Optical Wireless Technology at Sydney 2000 Olympic Games*" Optical Wireless Communications III, Proceedings of SPIE, vol. 4214, Nov. 6–7, 2000, pp. 1–10.

G. Nykolak, et al., "*A 160 Gb/s Free Space Transmission Link*", Optical Wireless Communications III, Proceedings of SPEI, vol. 4214.

D.M. Britz, et al., "*Broadband Local Serivce Offerings Using Free–Space Optical Links; A Network Business Perspective*", Optical Wireless Communications III, Proceedings of SPIE, vol. 4214.

J.P. Dodley, et al., "*Free Space Optical Technology and Distribution Architecture for Broadband Metro and Local Services*", Optical Wireless Communications III, Proceedings of SPIE, vol. 4214.

G.A. Pasmanik, et al., "*Interrelation between the coherence properties and the space–time structure of light beams*", Plenum Publishing Company, 1981, pp. 809–814.

A.A. Leshchev, "*Method for measuring the number of spatially coherent modes in optical radiation*", Optics and Spectroscopy, vol. 55, No. 6, Dec. 1983, pp. 599–600.

M.V. Vasilev, et al., "*Reduction of contrast of speckle structure in an image on laser illumination*", Optics and Spectroscopy, vol. 70, No. 1, Jan. 1991, pp. 2–3.

* cited by examiner

METHOD OF FORMING OPTICAL RADIATION BEAMS FOR FREE-SPACE OPTICAL COMMUNICATION SYSTEMS

FIELD OF THE INVENTION

The present invention relates to beam formation for free-space optical communication systems. The improved free-space optical communication systems can be used for two-way information transfer between remote objects without any wires and/or optical fibers for connection of these objects, including the case when there are many objects taking part in the information exchange, e.g. for organization of a point-to-multipoint exchange, i.e., a two-way information exchange between a base station transceiver terminal and several subscribers.

BACKGROUND

Through fibers, optical communications provides high-speed data transmission over relatively long distances, for a wide range of applications and services. The use of fiber, however, is not always practical and/or cost effective. Radio frequency (RF) wireless solutions reduce the time, complexity and cost of installation, but those solutions are inherently limited by their use of shared RF spectrum which is narrow compared to optical spectrum. As the number of users on a given piece of spectrum, the average capacity available to any one user further declines.

Another alternative approach to data communication services involves free-space optical communications. There have been a number of proposals to supply data signals to a laser, couple the laser output to an optical system, transmit the optical signal via line of sight, and recover the information at a remote receiver. Such systems offer two-way information transfer between remote objects without use of wires and/or optical fibers. Because such systems utilize optical radiation characterized by extremely high carrier frequency and can implement non-interfering links to the individual customer premises, such systems are not subject to the limits imposed by the carrier frequency or shared capacity, as in the existing RF and microwave wireless technologies.

In many embodiments of such free-space optical communication systems, the optical radiation from a light source propagates from the transmit terminal to the subscriber from a source of light (in most cases, a laser) with a modulator, driven by a data stream, through a light guide (optical fiber) to an optical antenna (telescope or other optical collector) forming a sufficiently narrow light beam which propagates through free space to a receiving optical system and through another optical fiber to a photodetector. If all other factors are the same, the optical radiation power losses along the above path depend on the geometry (length, diameter, etc.) and type of the optical fibers used.

Free space optical communication systems implemented previously have utilized single mode fibers for transport of the beams from the laser sources to the optical emitting antenna elements. In such an implementation, the signal radiation is guided to the collector by a thin (single-mode) fiber. As known, the radiation passed through such fibers does not have any local minima. Accordingly, there are no such minima in the receive aperture plane (at least if the propagation path has sufficiently high optical quality). An example of such a system is described in Szajowski et al., *Eight-channel Video Broadcast Feed Service using Free-Space Optical Wireless Technology at Sydney 2000 Olympic Games*, Optical Wireless Communications III, Proceedings of SPIE, Vol. 4214, Nov. 6–7, 2000, pp.1–10.

A drawback of a system with a single-mode fiber is that small diameter of the fiber makes it difficult to obtain high efficiency of the radiation coupling into the fiber from a radiation source, which usually is a laser diode. Commercially available devices comprising a laser diode and a single-mode fiber coupled to it (so-called "pigtailed" laser diodes) typically have a radiation coupling efficiency of 25–30%. In other words, the interface between the laser diode and the fiber is actually attenuating the light power by 3–4 times, causing a decrease in the communication range and availability.

Another drawback in using a single-mode fiber is that the light beam formed by it is not resistant to optical inhomogeinities of the free-space optical path. Experiments accomplished by the authors of this invention have demonstrated that, if there are aberrations in the optical path located close to the transmit aperture (rain drops or other small scale aberrations on protecting optical surfaces, such as windows through which the output radiation passes, etc), considerable nonuniformities appear in the transverse intensity distribution of the light on the receive aperture at the remote station. The negative effect of such spatial intensity fluctuations on the quality of communications has already been discussed above. The authors' experiments proved that the use of a multimode fiber to deliver the optical radiation to the transmitting optical antenna decreases contrast of intensity fluctuations caused by the small-scale optical inhomogeinities located close to the antenna.

Additionally, the manufacturing of the pigtailed laser diodes with single-mode fibers is difficult, and thus the cost of such devices is significantly higher than the costs of the components taken separately, that is to say a laser diode and a fiber applicable for free-space optical communication systems.

The use of a multimode optical fiber, which has a diameter significantly larger than that of a single-mode fiber strongly increases the efficiency of radiation coupling into the fiber, makes alignment substantially easier and considerably reduces the cost of a pigtailed laser diode. However, the multimode fiber creates a different set of technical problems.

In a transmitting system using a fiber with a relatively large core diameter (a multimode fiber), the optical radiation field becomes spatially non-uniform after propagating along the fiber. The radiation field has local maxima and minima in cross-sectional intensity distribution (this is so-called speckle-pattern), with large differences in magnitudes between them. Thereby an optical field with high contrast of the light intensity spatial fluctuations is formed. The fluctuations do not vanish after the radiation passes through the collector; the light beam remains spatially nonuniform along the whole propagation path, including at the receive system aperture of a remote receiving device or system, to which data stream carried by the beam is addressed.

If the receive aperture occasionally coincides with a local optical field intensity minimum, the quality of communication may degrade, which may even break communication because of insufficient received signal power entering the aperture in view of such intensity minimum.

In principle, this effect may be compensated by a manifold increase of the transmitter output power, but such compensation is not practical for technical and cost considerations.

Another way to mitigate the intensity non-uniformity effect is to increase the receive aperture size till it significantly exceeds the average speckle size in the speckle-pattern. In this case the receive aperture always captures several speckles, and the photodetector responds to the optical field intensity averaged over the cross-section of the aperture. However, for a given size of the transmit aperture, when the distance to the receiver system increases, the average speckle size also increases, thus requiring a corresponding increase of the receive aperture diameter, which is not always practical. For a given distance to the receiver, it is also possible to make the speckles size smaller by increasing the transmit aperture diameter. This solution also has the limitations related to: size, weight and cost of transmit optical telescopes (collectors).

In principle, it would be theoretically possible to suppress the fluctuations by spatial decoherentization of the optical radiation, which decoherentization leads to a reduced contrast of interference patterns, including speckle-patterns, created by the optical field. A necessary condition for the decoherentization is the radiation polychromaticity. The polychromatic radiation sources may have various designs. For example, in the patent application EP No.1 12076, 1984, a polychromatic source for use in optical fiber transmission systems comprises several lasers radiating at different wavelengths. However, the radiation polychomaticity provided by this source is insufficient for the decoherentization. A sufficient condition for the decoherentization requires the presence of a path difference between spatial components of the radiation (plane waves in free space, or modes in any waveguide structure along which the radiation is propagating) exceeding the longitudinal coherence length of the radiation, which, as known, is determined by its frequency spectrum width. Perhaps for at least this reason, such sources have not been used to enable multimode fiber transport of signals intended for free-space optical communication.

A method is known of light beam forming, used in point-to-multipoint free-space optical communication systems (see the description of the U.S. Pat. No. 5,786,923). The known method includes modulation of optical radiation by an information signal, and its subsequent concentration on the subscriber's receiving aperture by an optical system (optical antenna). A disadvantage of the known method is that for its implementation a system is required with the design which is complicated and does not provide for compactness: the light from the modulator is guided to the optical antenna by means of a combination of mirrors, a beam splitter, and a deflector, which in turn requires additional means for alignment of mirrors, or electronic control means (for deflectors).

Another method of light beam forming for free-space optical communication systems, known from U.S. Pat. No. 4,960,315 and U.S. Pat. No. 5,062,150 provides for channeling a modulated optical radiation from a radiation source through a fiber, and its subsequent concentration by an optical antenna.

This method has disadvantages mentioned above. If a single-mode fiber is used in it, then it is impossible to couple all the optical radiation from the source into the fiber because of the small diameter of the fiber. Thus, radiation power losses appear, and a more powerful light source is required. A more powerful light source may comprise a fiber optic amplifier, which is expensive. If a multimode fiber is used, its multiple modes are being excited and interfere inside the fiber, and as a result of their interference a speckle-pattern appears (see, for example, Patent Application EP No. 112076).

At the same time, it is necessary to take into account that a free-space optical communication system design is significantly simplified by way of using fibers for beam delivery in the transmission optical path from the radiation source to the optical antenna (radiation concentrator). It is therefore advisable, on the one hand, to use the fibers in the beam forming systems for free-space optical communication. On the other hand, it is necessary to minimize the radiation losses and the spatial fluctuations caused by the fiber presence in the path between the radiation source and the optical antenna, thus increasing the communication range and availability of the communication channel.

Hence there is an ongoing need for a technique to allow use of a multimode fiber in the beam forming process of a free-space communication system and yet avoid the noted problems with multimode fiber transport.

SUMMARY OF THE INVENTION

The optical radiation beam forming method of this invention is oriented towards decreasing below a predetermined level the contrast of the light field speckle-pattern caused by use of multimode fiber in the beam forming process. The use of the multimode fiber reduces power losses in free-space optical communication systems, decreases the system manufacturing costs and increases the communication range and the channel availability. Techniques are provided to design system parameters, at least within ranges, so as to smooth the speckle-pattern and provide a speckle-pattern contrast at or below the predetermined level.

Optical radiation is formed with a frequency spectrum width $\Delta v$. In an embodiment using a semiconductor laser source, the radiated energy includes a plurality of spectral lines within the frequency spectrum width $\Delta v$. The optical radiation has been modulated to carry an information signal, which has a frequency bandwidth $\delta v$. The modulated optical radiation is applied to a multimode optical fiber, in such a manner that the applied radiation has an angular spectrum width of $\Delta \theta$. The angular spectrum width $\Delta \theta$ preferably exceeds the diffraction limit angle corresponding to the fiber core diameter of the particular multimode optical fiber. This technique effectively converts the optical radiation into the complete set of multimode fiber modes supported by the fiber. Within the fiber, the maximum propagation velocity difference between the said modes being $\Delta V$.

Distinguishing features of the inventive technique include the determination of the parameters of the optical radiation and the fiber parameters based on the following expressions:

$$L \cdot \Delta v > \frac{V^2}{\Delta V}$$

and $$L \cdot \delta v < \frac{V^2}{\Delta V}$$

where:

L is the fiber length, m;

$\Delta v$ is the frequency spectrum width of the formed optical radiation, $\sec^{-1}$;

$\delta v$ is the modulation signal frequency bandwidth, $\sec^{-1}$;

V is the mean velocity of the optical radiation modes propagating along the fiber, m/sec;

$\Delta V$ is the maximum difference between propagation velocities of the modes exited by the radiation in the fiber, m/sec, which difference depends on the fiber material refraction index distribution across the fiber and on the angular spectrum width $\Delta \theta$; and Δθ is the angular spectrum width of the optical radiation coupled into the fiber input end, measured in radians.

The first expression $$L \cdot \Delta v > \frac{V^2}{\Delta V}$$

serves to define the minimum parameters for the necessary incoherence, that is to say the minimum requirement that the spectral components of the radiation at the outer boundaries of the frequency spectrum width Δv are incoherent with respect to each other at the fiber output.

As an optical radiation carries information through a multimode fiber characterized by intermodal dispersion, the longer the distance traveled the more the propagation tends to overlap bit intervals because of different velocities of the modes in the fiber (for example, in the case of amplitude modulation, intermodal dispersion distorts the information carrying pulses). The second expression $$L \cdot \delta v < \frac{V^2}{\Delta V}$$

serves to define a maximum limit on the fiber length, so that the fiber is not so long as to overly degrade the information transmission due to pulse lengthening or the like as the radiation traverses the length of the fiber.

Another aspect of the inventive methodology involves forming the optical radiation frequency spectrum of separate spectrum lines with a minimum spacing between them, exceeding δv.

Another feature of the method relates to forming the optical radiation with a number of spectrum lines N and an angular spectrum width Δθ providing excitation of A modes within the fiber, while N and A are selected in accord with the following expression:

$$\frac{A+N-1}{A \cdot N} \leq C^2,$$

where:

N is the number of the radiation spectrum lines;

A is the number of modes excited in the fiber at each of the spectrum lines; and C is a targeted limit for maximum contrast of the optical radiation field speckle-pattern at the fiber output.

Maximal speckle-pattern contrast is lower than C, provided the inequality $$\frac{A+N-1}{A \cdot N} \leq C^2$$

is satisfied, and each of the optical fields corresponding to each of the N radiation spectrum lines and consisting of A modes are incoherent with respect to each other. To provide such incoherence it is necessary to pre select the parameters of the optical radiation and of the fiber so as to satisfy the expression:

$$L \cdot \Delta v > (N-1) \cdot \frac{V^2}{\Delta V}.$$

Using the above rules of selection the radiation and the fiber parameters, one can decrease the speckle pattern contrast below value C permitted by the free-space optical communication system design and avoid the negative effect of speckle-patterns on the system operation.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The essence of the devices, which are the subject of this application, is explained by the examples of its implementation as well as by the drawings discussed below. In the various figures, like reference numerals refer to the same or similar elements.

FIGS. 3(a–c) depict simplified illustrations of speckle-patterns as might be produced by multimode fiber transport of the three spectral lines, such as those plotted in FIG. 2.

DETAILED DESCRIPTION OF THE PRESENTLY PREFERRED EMBODIMENTS

Reference now is made in detail to the presently preferred embodiments of the invention, examples of which are illustrated in the accompanying drawings and discussed below.

The inventive technique for forming an information-carrying beam, for a free-space optical communication system, decreases the contrast of the light-field speckle-pattern produced by a large diameter (multimode) fiber. This facilitates use of the large diameter fiber in at least the transmitting system to reduce the power losses, particularly at the coupling of the source to the fiber. Use of such a fiber decreases the system manufacturing costs and increases the communication range as well as the channel availability.

Figure 1:
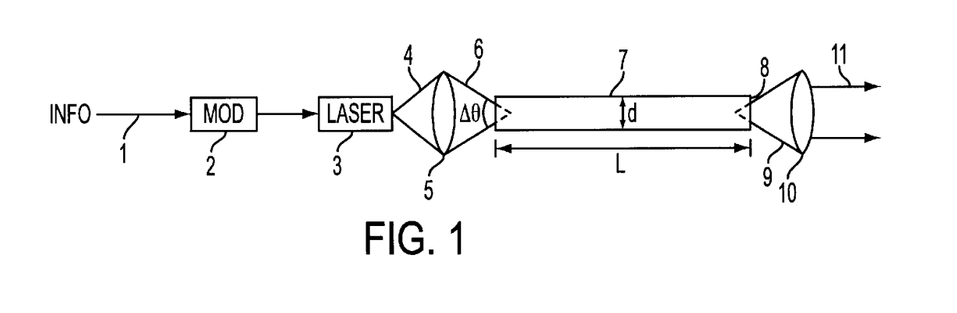
FIG. 1 is a simplified functional diagram of a free-space optical communication system implementing the inventive methodology.

FIG. 1 shows in simplified/functional form, the beam forming elements of a free-space optical communication system utilizing the inventive techniques. As shown, information (1) is supplied to a modulator (2), which drives a source (3) of optical radiation, typically in the form of a laser. The laser (3) emits an optical radiation beam (4) that is modulated with the information signal.

Figure 2A:
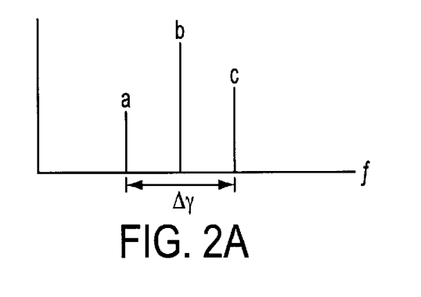
FIG. 2A is an approximation of the spectral characteristics of an exemplary polychromatic light source.

A laser often is considered as a monochromatic light source. However, semiconductor lasers actually emit optical radiation over a finite frequency spectrum width, particularly if driven at higher pumping or amplification rates. In accord with the invention, the laser source (3) operates as a polychromatic light source, for example emitting a radiation pattern with a plurality of spectral lines as shown in FIG. 2A.

The light source emits radiation containing a number N of spectral lines. A semiconductor laser can be driven to emit 3–4 lines with substantially equidistant spacing between the lines. In the example, the laser (3) emits radiation containing three distinct spectral lines a, b and c. The outer boundary of the frequency spectrum, in the example, the frequency spacing between the outer lines a and c is the frequency spectrum width Δv. In the embodiment, the radiated energy includes N spectral lines within the frequency spectrum width Δv, where N=3. The distance between the lines is Δv/(N−1).

Figure 2B:
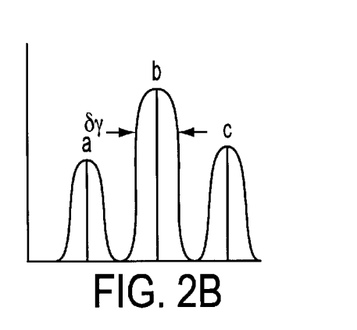
FIG. 2B is an approximation of the spectral characteristics of an exemplary polychromatic light source after it is modulated by the information carrying signal.

As noted, the source (3) is modulated at (2) with an information signal (1) intended for free-space communication to a remote device. The information signal has a frequency bandwidth δv. FIG. 2B shows the effect of the superposition of the information of bandwidth δv on the three spectral lines in the radiation emitted by the source (3). The spacing between the spectral lines should be greater than δv, so that there is no significant spectral overlap between the modulated spectral lines that might cause modulation of the radiation on the frequencies falling within the frequency interval of the transmitted signal. The spacing between the lines is also sufficient that after traveling through the fiber the optical field corresponding to each of the lines is incoherent with respect to the optical fields corresponding to each of the adjacent lines.

Returning to FIG. 1 the modulated optical radiation (4) is processed through an optical element or lens (5) and applied as a beam (6) to a multimode optical fiber (7). The optical element (5) is constructed so that the angular spectrum width of Δθ of the beam (6) somewhat exceeds the diffraction limit angle corresponding to the fiber core diameter d of the particular multimode optical fiber (7). This diffraction angle is equal to λ/d, where λ is the radiation wavelength, and d is the fiber core diameter. Application of the beam (6) with wide angular spectrum Δθ to the input end of the fiber (7) substantially immediately excites for each spectral line all of the possible modes that are supported by the particular optical fiber (7). The angular spectrum width Δθ should not exceed 2·Φ, where Φ is the critical angle of the fiber, because if it did, components outside the critical angle would not remain within the fiber core, which would increase power loss and reduce efficiency.

The optical radiation passes along a length L of the optical fiber (7) and emerges from an end face (8) as a beam (9). A second optical element or system (10) serves as the optical antenna for forming and directing the beam for free-space transmission over link (11) to a remote communication device.

Figure 3A:
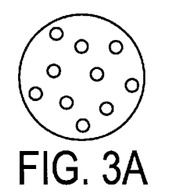
Figure 3B:
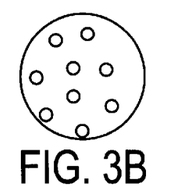
Figure 3C:
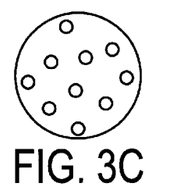
Figure 4:
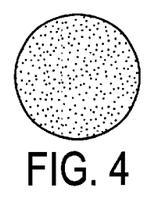
FIG. 4 is a simplified illustration of the relatively low-contrast output intensity pattern of the multimode fiber, when used in a beam forming technique in accord with the present invention.

If considered alone, passage of each spectral component of the optical radiation through a fiber (7) with a relatively large core diameter (a multimode fiber) would produce an optical radiation field at the end face (8) that is substantially spatially non-uniform. Because of the differences in wavelength, each of three lines a, b and c, having identical speckle patterns at the fiber entry, would produce somewhat different speckle patterns at the fiber output, as represented by the simplified examples shown in FIG. 3(a), FIG. 3(b) and FIG. 3(c) in FIG. 3. However, in the inventive system, since the various spectral components of the radiation propagate through the fiber (7) together, all such interference patterns overlap. Overlapping of different speckle-patterns decreases the contrast of the consolidated light-field specklepattern produced at the end face (8) of the fiber (7), as represented by the simplified example shown in FIG. 4.

The field patterns corresponding to different spectrum lines also interfere with each other forming non-stationary (changing in time) interference patterns at the fiber output. However because the spacing between the spectrum lines is selected wider than the signal bandwidth, noise related to such interference falls outside the signal spectrum and does not deteriorate the information.

Hence, in a system utilizing a polychromatic light source the optical radiation is thereby formed so that it has a frequency spectrum width Δv, and an angular spectrum width Δθ exceeding the diffraction limit angle corresponding to the fiber core diameter. This diffraction angle is equal to λ/d, where λ is the radiation wavelength, and d is the fiber core diameter. The optical radiation is modulated by a signal having a frequency bandwidth δv and is then converted into the multimode fiber modes with maximum propagation velocity difference between the modes of ΔV.

In accord with the preferred embodiment, the parameters of the optical radiation and of the fiber are selected so that the spectral components of the radiation at the outer boundaries of the frequency spectrum width Δv are incoherent with respect to each other. Specifically, parameters are selected so that $$L \cdot \Delta v > \frac{V^2}{\Delta V},$$

which sets certain minimum characteristics for the necessary incoherence. To insure proper transport of information modulated on the optical beams, it is necessary to limit the length of the fiber. Specifically, as the radiation carries information through a fiber, the longer the distance traveled the more the propagation tends to lengthen the information carrying pulses of the beam. Hence, the parameters of the optical radiation and of the fiber are selected so that the fiber is not so long as to overly degrade the radiation pulses. In that regard, the parameters should conform to the expression $$L \cdot \delta v < \frac{V^2}{\Delta V}.$$

In these expressions, L is the fiber length, m; Δv is the frequency spectrum width of the optical radiation, sec$^{-1}$; δv is the modulation signal frequency bandwidth, sec$^{-1}$; and V is the mean velocity of the optical radiation modes propagating along the fiber, m/sec. ΔV is the maximum difference between propagation velocities of the modes exited by the radiation in the fiber, m/sec, which difference depends on the fiber material refraction index distribution across the fiber and on the angular spectrum width Δθ (Δθ is the angular spectrum width of the optical radiation coupled into the fiber input end, measured in radians).

Another aspect of the inventive methodology involves forming the optical radiation frequency spectrum of separate spectrum lines with a minimum spacing between them, exceeding δv. Preferably, the spacing between the lines is sufficient that radiation corresponding to each of the lines is incoherent with respect to the radiation, corresponding to each of the adjacent lines. To that end, the pre-selection of the optical radiation and the fiber parameters is required to satisfy the following expression:

$$L \cdot \Delta v > (N - \Delta) \cdot \frac{V^2}{\Delta V}.$$

Another feature of the method relates to forming the optical radiation with a number of spectrum lines N and an angular spectrum width $\Delta\theta$ providing excitation of A fiber modes, so as to provide a contrast that does not exceed a target maximal contrast C required for efficient operation of the free-space communication system. To that end, N and A are selected so as to satisfy the following expression:

$$\frac{A+N-1}{A\cdot N} \leq C^2,$$

where:

N is the number of the radiation spectrum lines;

A is the number of modes excited in the fiber at each of the spectrum lines;

C is an upper limit for maximum contrast of the optical radiation field speckle-pattern at the fiber output.

To clarify the reasons of an effective smoothing (decreasing the contrast) of the speckle-pattern, provided by the use of the proposed invention, let us consider the mechanism of the speckle pattern appearance. When the radiation enters the multimode fiber, many transverse modes with different propagation velocities are excited in the fiber. The interference between such modes leads to the speckle-pattern appearance.

The difference in the propagation velocities of the modes inside the fiber causes a difference of the optical field speckle-pattern in various fiber cross-sections, because the coefficients of the field expansion by the modes are varying from one cross-section to another one. If the optical radiation is monochromatic, the interference pattern created by the fiber modes (the optical field speckle-pattern) is stationary in any cross-section (provided there are no variations of shape and other fiber parameters in time—see, for example, Patent Application PCT/GB89/00248), and the speckle-pattern contrast is maximal.

Let us assume that spatially coherent non-monochromatic radiation enters the multimode fiber having two spectrum components. In this case, because of the similarity of the transverse structure of the spectrum components transverse structure at the entry end of the fiber, the radiation distribution of each spectrum component over the transverse modes will be also similar, i.e. the coefficients of the optical field expansion by the fiber modes in this place are identical for both spectrum components.

The mode propagation velocities depend not only on the mode index (number), but also on the wavelength. Therefore the variation of the field expansion coefficients from one fiber cross-section to another will not be similar for different spectrum components. As a result, the transverse distributions of the two spectrum components of the field, which are coincident in one fiber cross-section (e.g. at its entry end), will not be further coincident while the radiation is propagating along the fiber. This means that the field distribution in the cross-sections becomes non-stationary. In other words, the field becomes spatially incoherent, i.e. decoherentization occurs.

At the same time, if the frequency spacing between two spectrum components is such that the photoreceiver having limited bandwidth does not sense (in other words "integrates" over time) the frequency beat corresponding to this spacing, then the resulting intensity distribution pattern at the fiber output will be perceived by the photodetector as a sum of two uncorrelated stationary speckle-patterns (one per spectral line). Such a summing of uncorrelated optical fields results in smoothing of intensity nonuniformities, i.e. in reduced contrast of speckles in the resulting pattern detected by the photoreceiver.

In the case of the optical fiber, the number of spatial degrees of freedom corresponds to a number of modes. Hence, the number spatial degrees of freedom A is the number of modes excited in the fiber at each of the spectrum lines. In our notation, N is the number of spectral lines in the radiation field propagating through the fiber. The upper limit for the number of uncorrelated spatially coherent components of the optical radiation grows when the numbers of spectral lines N and of spatial degrees of freedom A grow. So, by increasing the numbers N and A, it is in principle possible to smooth out the speckle-pattern in the optical field to the required extent.

The problem has been analyzed regarding decrease in speckle-pattern contrast caused by the spatial incoherence of the illuminating optical radiation. The calculations show that the average contrast C of the light field speckle-pattern registered by the photoreceiver is related to the number of spectral components N and spatial degrees of freedom A of the optical field in accordance with the expression $$C^2 = \frac{A+N-1}{A\cdot N}.$$

For an optical fiber, the number A is equal to a number of the modes excited in the fiber and depends on the parameters of the optical radiation and the fiber. For example, for the fiber with step-wise cross-sectional distribution of the refractive index, $A=(\Delta\theta\cdot d/\lambda)^2$, where $\lambda$—the radiation wavelength; d—the fiber diameter.

In accordance with a preferred feature of the present invention, it is necessary to select N and A satisfying the following inequality, to ensure that the speckle-pattern contrast does not exceed the permitted limit $$C^2 > \frac{A+N-1}{A\cdot N}.$$

In practice, the contrast reduction may be even more significant than forecasted due to a partial depolarization of the optical radiation after its propagation in the fiber, i.e. modes may be excited with a polarization orthogonal to the initial one. Thus, an additional speckle pattern may appear in the fiber, which does not interfere with the pattern having the initial polarization. It is clear that a presence of such a pattern will cause additional smoothing of the transmitted optical radiation field pattern.

The radiation frequency spectrum may be discrete as well as continuous. It is clear that in the latter case the identified intensity distribution pattern contrast will also decrease with an increase of the total spectrum width, because the whole spectrum range may be divided into spectrum bands playing the role of separate spectrum components in the above considerations.

For quantitative estimation of the minimum fiber length where the radiation polychromaticity effect does manifest itself, let us expand the field by fiber modes for a case when two spectrum lines are present:

$$E(x, y, z, t) = e^{iw_1 t} \cdot \sum_n C_n^{(1)}(z) \cdot E_n(x, y) + e^{iw_2 t} \cdot$$

$$\sum_n C_n^{(2)}(z) \cdot E_n(x, y)$$

$$= e^{iw_1 t} \cdot \sum_n a_n e^{i\beta_n^{(1)} z} \cdot E_n(x, y) + e^{iw_2 t} \cdot$$

-continued $$\sum_n a_n e^{i\beta_n^{(2)} z} \cdot E_n(x, y)$$

where $\beta_n^{(1)}$ and $\beta_m^{(2)}$ are the propagation constants of separate modes; $\beta_j^{(i)} = k^{(i)} n_j k^{(i)} = 2\pi/\lambda_i$—wave number of the light wave; $\lambda_i$—light wavelength in vacuum; $n_j$—effective refractive index for the fiber mode with the number j.

At z=0, the light fields corresponding to the two spectrum lines are identical. For this reason, the coefficients of such light fields expansions by the modes are identical as well:

$$C_n^{(1)}(0) = C_n^{(2)}(0).$$

The process of the modes dephasing for the modes having the maximum difference of propagation constants will now be considered. For example, consider the mode having the least index $HE_{11}$ with propagation constants $\beta_0^{(1)}$ and $\beta_0^{(2)}$ at the two corresponding wavelengths $\lambda_1$, and $\lambda_2$, and another mode having the highest index $HE_{nm}$ with the propagation constants $\beta_m^{(1)}$ and $\beta_m^{(2)}$ at the two corresponding wavelengths $\lambda$, and $\lambda_2$. The field expansion coefficients for these modes in the fiber will be $$C_0^{(1)} = a_0 \cdot e^{i\beta_0^{(1)} z}; \quad C_m^{(1)} = a_m \cdot e^{i\beta_m^{(1)} z};$$
$$C_0^{(2)} = a_0 \cdot e^{i\beta_0^{(2)} z}; \quad C_m^{(2)} = a_m \cdot e^{i\beta_m^{(2)} z};$$

At a distance L from the fiber input face, the phase difference for the modes corresponding to radiation with $\lambda_1$, will be $$\Delta\Phi_1 = (\beta_0^{(1)} - \beta_m^{(1)}) \cdot L$$

For the other wavelength, the corresponding phase difference of the same modes will be $$\Delta\Phi_2 = (\beta_0^{(2)} - \beta_m^{(2)}) \cdot L$$

It is evident that the wavelength difference of the spectrum components will have a significant effect on mismatching the transverse patterns formed due to the interference of these mode pairs, if $$\Delta\Phi = \Delta\Phi_1 - \Delta\Phi_2 = [(\beta_0^{(1)} - \beta_m^{(1)}) - (\beta_0^{(2)} - \beta_m^{(2)})] \cdot L > 2\pi$$

Taking into account that the propagation constants for extreme modes are defined by the following expressions:

$$\beta_0^{(1)} - \beta_m^{(1)} = \frac{2\pi}{\lambda_1} \cdot (n_0 - n_m) \text{ and } \beta_0^{(2)} - \beta_m^{(2)} = \frac{2\pi}{\lambda_2} \cdot (n_0 - n_m)$$

we obtain $$(n_0 - n_m) \cdot L \cdot \left(\frac{1}{\lambda_1} - \frac{1}{\lambda_2}\right) > 1, \quad \Delta n \cdot L > \frac{\lambda^2}{\Delta\lambda} \equiv \frac{V}{\Delta v}$$

It can be shown that $$\Delta n = \frac{\Delta V}{V}.$$

Taking this into account, from the previous expression we obtain $$L \cdot \Delta v > \frac{V^2}{\Delta V}.$$

This requirement may be also presented as $$L \cdot \frac{\Delta V}{V} > \frac{V}{\Delta v},$$

which may be clearly interpreted from the point of view of physics. This requirement means that the maximum path difference between different modes at the fiber output, which is $$L \cdot \frac{\Delta V}{V},$$

should exceed the coherence length of the optical radiation with the spectrum width $\Delta v$ used in the system, which is $$\frac{V}{\Delta v}.$$

It is known that $\Delta V$ depends on the propagation velocity V, on the angular spectrum width of the radiation $\Delta\theta$, and on the fiber material refraction index distribution across the fiber. If, for example, the distribution is step-wise, i.e. the core refraction index is the same in the whole cross-section of the fiber, then:

$$\Delta V = \frac{V \cdot (\Delta\theta)^2}{8n^2}$$

where n is the core refraction index.

There is also another limitation of the fiber length, caused by the requirement that the difference in propagation time for modes propagating along the fiber should not result in distortion of the transferred information. In other words, the difference in propagation times should be less than the time interval r carrying a unit of information (so called bit interval). Taking into account that $$\tau \approx \frac{1}{\delta v},$$

where $\delta v$ is the signal bandwidth, we obtain $$\frac{L}{V_1} - \frac{L}{V_2} < \frac{1}{\delta v},$$

where $V_1$, and $V_2$ are the propagation velocities of various modes in the fiber, while $V_1 - V_2 = \Delta V$. With an account for this, the last expression may be presented as $$L \cdot \delta v < \frac{V^2}{\Delta V}.$$

If this condition is met, the pulse broadening caused by the mode propagation velocity difference will be less than $\tau$.

In the case of the optical radiation consisting of N spectrum components, the implementation of the full capabilities of the proposed method requires that the speckle-patterns corresponding to any neighboring spectrum lines lose spatial correlation after propagating through the fiber like it was demonstrated above for the radiation with two spectrum components. To meet this requirement it is necessary that the following condition is fulfilled:

$$L \cdot \Delta v > (N-1) \cdot \frac{V^2}{\Delta V}.$$

The essence of the method, which is the subject of this application, is made clear by examples of its implementation, and by the corresponding drawing. In FIG. 1, a simplified block diagram is presented of a transmission system, which may be used for implementation of this method.

The device comprises a source (3) of optical radiation, with means for modulation of the radiation of with an information signal 1. An optical element (5) forms a required angular spectrum of the radiation. A fiber (7) and an optical collector (optical antenna) (10) transmit the resulting output beam (11).

To fully understand the inventive concepts, it may be helpful to consider several specific examples.

EXAMPLE 1

The optical radiation beam forming method may be implemented in the following way.

First, the fiber length L is determined to provide the radiation transfer from the source location 1 to the optical antenna (collector) 4. The fiber length in this example is selected based on the relative positions of the source and the antenna.

The source should have a spectrum width $\Delta v$, derived from the expression $$L \cdot \Delta v > \frac{V^2}{\Delta V}$$

(see the formula of the current invention). The $$\frac{V^2}{\Delta V}$$

value, as shown in the description of the invention, depends on the radiation angular spectrum width $\Delta \theta$. This angular spectrum is formed by an optical system, which is simple and inexpensive, provided $\Delta \theta \leq 0.3$. If a standard step-index quartz fiber is used, the value $\Delta \theta = 0.3$ corresponds to $$\frac{V^2}{\Delta V} = 4 \cdot 10^{10} \text{ m/sec}.$$

Accordingly, the spectrum width $\Delta v$ in this example should satisfy the expression $$\Delta v > \frac{4 \cdot 10^{10}}{L} \text{ sec}^{-1}.$$

It follows from the expressions $$L \cdot \Delta v > \frac{V^2}{\Delta V} \text{ and } L \cdot \delta v < \frac{V^2}{\Delta V},$$

that the modulation signal frequency bandwidth $\delta v$ in the proposed method is always less than $\Delta v$. Thus, if a several meters long fiber is used, $\delta v$ should not exceed $\sim 10^{10}$ sec$^{-1}$. Typically, the existing free-space optical communication links are designed for $\delta v \leq 10^9$ sec$^{-1}$. Therefore the proposed method does not put any inadmissible restrictions on the bandwidth $\delta v$ and thus on the information transfer rate.

In optical communications, multimode lasers are used from time to time where the output radiation consists of several nearly equidistant spectrum lines. If such a source of radiation is used in our case, the number N of lines shall be selected to provide a required limitation on the contrast C of the speckle-pattern at the fiber output. The necessary for that number N may be derived from the expression $$\frac{A+N-1}{A \cdot N} \leq C^2,$$

as discussed earlier analyzing this expression, one can see that it can be satisfied only if simultaneously $$\frac{1}{A} < C^2 \text{ and } \frac{1}{N} < C^2.$$

Thus, using the last inequality, it is possible to determine the N value.

With a given N, one should find the value for A from the expression $$\frac{A+N-1}{A \cdot N} \leq C^2.$$

As shown in the description above, the A value depends directly on the fiber diameter d. For a step-index fiber, this dependence is expressed as $$A = \left(\frac{\Delta \theta \cdot d}{\lambda}\right)^2,$$

where $\lambda$ is the radiation wavelength. For a known wavelength, we calculate the diameter d corresponding to the above expression. Thus, we obtain the last parameter necessary for development of a device implementing the proposed method.

Thereafter, a transmitting device may be implemented with the calculated parameters. For that purpose, the radiation with a spectrum width $\Delta v$ coming from the source is modulated in the unit (2) by a signal with a frequency bandwidth $\delta v$, and guided into the element (5), implemented, for example, as a lens or a similar optical system transforming the incident beam with an arbitrary angular spectrum width into a beam with a specified width $\Delta \theta$, which is coupled into the input face of the fiber (7). The light beam from the fiber output is than guided to the collector (antenna) (10) where it is concentrated and targeted onto the remote terminal receiver. As a result, a light beam carrying the information is obtained with the contrast of the spatial nonuniformities of the light field being lower than C.

EXAMPLE 2

In this example let us select the maximum level of speckle pattern contrast for the radiation at the fiber output equal to 35% (C=0.35). The required number of spectrum lines N and of the fiber modes A may be determined from the condition $$\frac{A+N-1}{A \cdot N} \le C^2$$

(see the Invention Formula). It follows from this:

$$A \ge \frac{N-1}{NC^2 - 1}$$

As A is always positive, it follows:

$$N > \frac{1}{C^2}$$

For C=0.35 we obtain N>8.

In accordance with this calculation result, let us select a radiation source with a number of equidistant spectrum lines N=11.

Substituting this value into the expression $$A \ge \frac{N-1}{N \cdot C^2 - 1},$$

we obtain $A \ge 29$. For a step-index fiber, as indicated above, $$A = \left(\frac{\Delta\theta \cdot d}{\lambda}\right)^2,$$

where $\Delta\theta$ is the angular spectrum width of the radiation with a wavelength $\lambda$, entering the fiber having a diameter of d. In accordance with this expression, the condition $A \ge 29$ is met if $$d \ge \sqrt{29} \cdot \frac{\lambda}{\Delta\theta}.$$

Let us specify $\lambda=10^{-6}$ m, and $\Delta\theta=0.3$, then, from the previous expression, $d \ge 1.8 \cdot 10^{-5}$ m.

Fibers meeting this criterion are commercially available. e.g., there are fibers $5 \cdot 10^{-5}$ m (50 micrometers) in diameter, which can be used in this case.

Let us select the modulation signal frequency bandwidth $\delta v=10^9$ sec$^{-1}$. Then the radiation spectrum lines may be selected with a spacing between them $10^{10}$ sec$^{-1}$, giving the total spectrum width for N=11 equal to $\Delta v=10^{11}$ sec$^{-1}$. Industrially manufactured step-index fibers have the core refraction index $n \approx 1.5$ (corresponding to the mean propagation velocity of the modes in the fiber $V \approx 2 \cdot 10^8$ m/sec). With this N value and an acceptance angle $\Delta\theta=0.3$ rad, $\Delta V=5 \cdot 10^{-2} \cdot V=10^6$ m/sec. Thereby $V^2/\Delta V=4.10^{10}$ m/sec, and $$(N-1) \cdot \frac{V^2}{\Delta V} = 4.4 \cdot 10^{10}.$$

To meet the conditions indicated in the invention formula, the fiber length L may be selected equal 5 m. Thereby $L \cdot \Delta v=5 \cdot 10^{11}$ m/sec, and $L \cdot \delta v=5 \cdot 10^9$ m/sec.

So, in this example the conditions are met:

$$L \cdot \Delta v > \frac{V^2}{\Delta V} > L \cdot \delta v,$$

$$L \cdot \Delta v > (N-1)\frac{V^2}{\Delta V}$$

and $$\frac{A+N-1}{A \cdot N} \le C^2.$$

The subsequent steps for implementation of a corresponding device are similar to those in Example 1.

EXAMPLE 3

Let us take, as a radiation source, a standard semiconductor laser diode operating in the $(0.7 \ldots 1.6) \cdot 10^{-6}$ m wavelength range, and oscillating at several longitudinal modes of the laser cavity. As known, the frequency spacing between such modes is $$\Delta v_1 = \frac{c_o}{2l \cdot n_1},$$

where $c_0$ is the velocity of light in vacuum ($3 \cdot 10^8$ m/sec), l is the laser cavity length, and $n_1$ is the refraction index of the laser medium.

High-power laser diodes have typically $l \approx 0.7 \cdot 10^{-3}$ m and $n_1 \approx 3.5$. Accordingly, for such laser diodes $\Delta v_1 \approx 6 \cdot 10^{10}$ sec$^{-1}$.

The laser diode pump current may be selected so that only two longitudinal modes will oscillate. In this case, the total spectrum width $\Delta v$ of the laser radiation will be equal to the $\Delta v_1$ value (for example, $6 \cdot 10^{10}$ sec$^{-1}$), and the number of modes is N=2.

Let us specify the wavelength to be equal $\lambda=1.5 \cdot 10^{-6}$ m, take a step-index fiber $4 \cdot 10^{-5}$ m in diameter, and specify the angular spectrum width $\Delta\theta=0.3$. For these values, the number of modes excited in the fiber $A=(\Delta\theta \cdot d/\lambda)^2$ will be 64.

Substituting A=64 and N=2 in the expression $$\frac{A+N-1}{A \cdot N} < C^2,$$

we obtain for this case an upper limit for the contrast being $C \approx 0.7$.

This value is sufficient for reliable operation of the equipment in most applications, because it corresponds to the maximum possible fluctuation in the receive radiation beam observed when the receive aperture diameter is infinitely small.

In some cases lower contrasts may be required, which may be achieved by increasing the number N of the spectral components from 2 to 3 or 4. It is also worth considering that in real cases the aperture has, of course a finite size. If the aperture size is comparable with the speckle size in the beam cross-section, the fluctuations in the power approaching the photoreceiver will be effectively smoothed, so that a standard deviation of such power divided by its average will be less than 0.7.

As the $\Delta\theta$ parameter in this example has the same value as in Examples 1 and 2, and the $\Delta v$ value is also nearly the same as in these examples, the requirements for $\delta v$ and L in this example are nearly the same as in the previous examples.

Knowing the values of all parameters, we can implement a specific beam-forming device by steps indicated in the Example 1.

Figure 5:
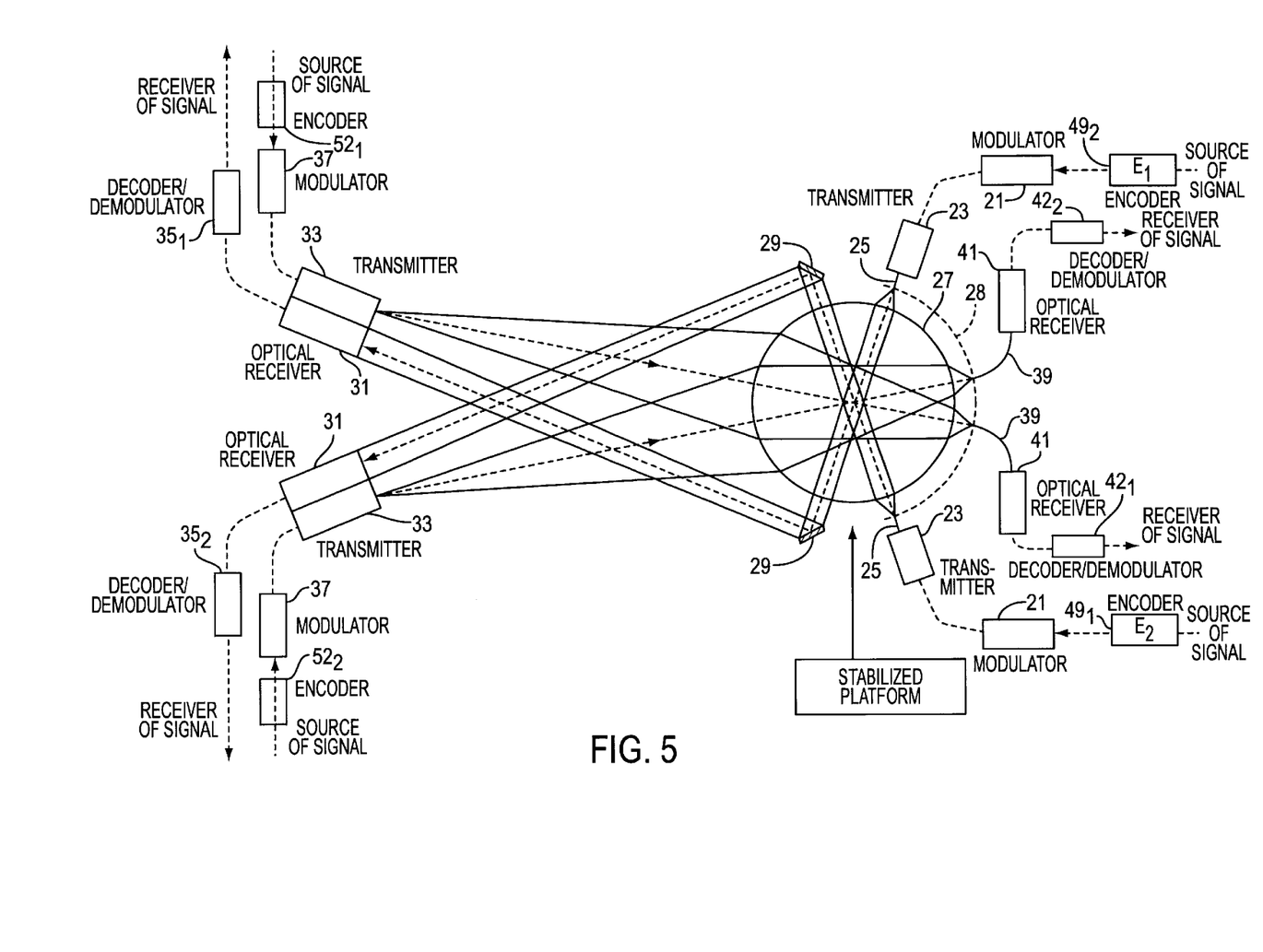
FIG. 5 is a functional block diagram of an embodiment of a free-space optical system, which may incorporate the inventive concepts, to provide communication services.

FIG. 5 depicts the schematic diagram of a multi-beam duplex optical communications system of a preferred embodiment using a shared spherical objective lens. The system offers the capability of wireless (optical) data transmission from a base station to several user/subscriber terminals located within wide field of view.

For each user served by the base station, a modulator 21 receives a signal for communication from a source such as a data network. Emission of the radiation source (transmit laser 23) of the base station is modulated in accordance with the electric signal coming from the information source through the encoder 49. The encoder $49_1$ processes the data signal for the first user, and a second encoder $49_2$ processes the data signal for the second user, before modulation of the respective source.

For each remote receiver, the transmit laser 23 sends the modulated beam through an optical fiber pigtail 25 to the spherical lens 27. In accord with the present invention, the transmit laser 23 is a polychromatic source, and the optical fiber pigtails 25 are relatively large diameter multi mode type fibers. The radiation parameters are selected in accord with the inventive methodology as described above. The lateral and axial position of the light-emitting end face of each optical fiber pigtail 25 relative to the lens 27 is controlled using an electromagnetic or electromechanical mounting device (not shown). Having gone through the wide-angle objective lens 27, radiation from each transmit laser is emitted as a beam directed onto a corresponding user terminal located at a distance of up to 2 km by means of a swivel exit mirror 29.

The base station transmit laser 23 represents a laser diode emitting on a nominal wavelength of 785 nm or 1550-nm, however, the laser will emit one or more additional lines within the frequency spectrum width $\Delta v$, as described above. The divergence of the beams emitted from the optic 27 preferably is relatively low. However, in applications where several users are located closely to each other, the divergence still may cause some overlap of the beams at the remote user terminals.

Each subscriber terminal includes an optical receiver 31 and an optical transmitter 33. The user receiver system consists of a narrow-angle reflector-type telescope and a photoreceiver subsystem. Each receiver 31 connects to a decoder/demodulator circuit 35 for demodulating and decoding incoming data from the received beam and supplying data to an appropriate receiving device, e.g. an actual end-user terminal (not shown).

The decoder/demodulator $35_1$ is adapted to receive only the information encoded by the encoder $49_1$, whereas the decoder/demodulator $35_2$ is adapted to receive only the information encoded by the encoder $49_2$. Stated another way, the decoders/demodulators $35_1$ and $35_2$ are sufficient to selectively receive and process signals intended for the particular remote station even if there is some overlap from the beam for a nearby remote station.

The user transmitter system 33 comprises several transmit units (4 units) consisting of 785-nm laser diodes with low-aperture shaping optics that emit narrow beams in the direction of the base station. Those skilled in the art will recognize, however, that these transmitters may use optical fiber pigtails and associated optical beam forming parameters, in accord with the inventive methods. Several transmit units preferably are located at a distance from each other, for suppressing intensity fluctuations caused by atmospheric turbulence and by interference between the beams from different transmit units. These elements output optical radiation in response to a signal coming from a source through an encoder 52 and a modulator 37. The encoder $52_1$ encodes information in a distinctive manner assigned to the associated terminal, and the encoder $52_2$ encodes information in a different manner associated with the other remote terminal, to differentiate the information from the two different user terminals.

Due to the base station optical module's original design, emissions coming from user terminals are received via the same spherical objective lens 27 used for shaping laser emissions transmitted to the users. This configuration of energy conveyance enables data reception from users located randomly within the maximum angle allowed by the spherical objective lens 27. Emissions received from transmitter systems 33 of the separate users are concentrated on the focal surface of the spherical lens 27 in areas optically conjugated with the respective user terminals. Entry ends of 0.5–1 mm-thick light guides 39 are mounted on curved surface 28 in the conjugated areas. The guides 39 provide for channeling of the emissions to base station receivers 41. The lateral and axial position of the light-receiving end face of each optical fiber pigtail 39, relative to the lens 27, preferably is controlled using an electromagnetic or electromechanical mounting device (not shown).

Again, there may be some beam overlap at the optical receivers. However, the decoder/demodulator $42_1$ is adapted to receive only the information encoded by the encoder $52_1$, whereas the decoder/demodulator $42_2$ is adapted to receive only the information encoded by the encoder $52_2$. Stated another way, the decoders/demodulators $42_1$ and $42_2$ are sufficient to selectively receive and process signals from the particular remote station even if there is some overlap from the beam at the base station.

In practice, angular drifts are possible of the base station optical transmit module's support surfaces caused by binding, twist and sways of the building holding the base station and of the support-and-swivel mechanism. Therefore, it is preferable to implement methods of collective (for all users) angular stabilization of beams originating from the base station optical transceiver module. Creation of such a stabilization system is proposed. Passive building vibration isolation systems will also be used.

The present invention admits of a wide range of modifications. For instance, the examples of optical source described above were semiconductor lasers emitting several spectrum lines. The inventive beam forming technique may use other polychromatic optical sources. One example of an alternate source is the source disclosed in U.S. Pat. No. 4,603,421 to Scifres et al. Another approach would be to use a wide bandwidth source of a type used for implementation of Optical Code Division Multiplexing (OCDM), see, for example. OFC 2001 Technical Digest, Tuesday, Mar. 20, 2001, TuV2-1, A robust and flexible all optical CDMA multichannel transmission system for the access domain, Jens Kissing, Edgar Voges, Thomas Pfeiffer.

As another example, the embodiments illustrated in the drawings provide direct modulation of the laser input. The present invention is similarly applicable in systems using external modulation of the beam after output by the laser.

The present invention admits of a wide range of applications. For instance, the example of FIG. 5 depicted an application of the inventive beam forming technique to a point-to-multipoint free-space optical communication service. Another example of use of the invention might facilitate a point-to-point free-space optical communication service.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications, applications and variations thereof that fall within the true scope of the invention.

What is claimed is:

1. A method of forming and transmitting a modulated optical radiation beam for free-space optical communication, the method comprising:

forming optical radiation modulated by an information signal, the modulated optical radiation having a frequency spectrum width $\Delta v$, wherein the information signal modulated on the radiation has a frequency bandwidth $\delta v$;

applying the modulated optical radiation to an input of a multimode optical fiber in such a manner as to excite substantially all possible modes for the optical radiation supported by the multimode fiber;

wherein the parameters of the optical radiation and of the multimode fiber are selected to satisfy the following expressions:

$$L \cdot \Delta v > \frac{V^2}{\Delta V}$$

and $$L \cdot \delta v < \frac{V^2}{\Delta V}$$

where:

L is the fiber length;

$\Delta v$ is the frequency spectrum width of the optical radiation;

$\delta v$ is the modulation signal frequency bandwidth;

V is mean velocity of the optical radiation modes propagating along the fiber; and $\Delta V$ is maximum difference between propagation velocities of the modes exited by the radiation in the fiber; and transmitting the modulated optical radiation as a beam from an output of the multimode fiber over a free-space optical link.

2. A method in accordance with claim 1, wherein the frequency spectrum of the optical radiation comprises a plurality of separate spectral lines with minimum spacing between them, exceeding $\delta v$.

3. A method in accordance with claim 2, wherein the plurality of separate spectral lines includes a number N of spectral lines, and an angular spectrum width $\Delta\theta$ of the modulated optical radiation at the input of the multimode optical fiber provides excitation of A fiber modes, and N and A are selected to satisfy the following expression:

$$\frac{A+N-1}{A \cdot N} \leq C^2$$

where N is the number of the radiation spectrum lines;

A is the number of modes excited in the multimode fiber at each of the spectrum lines; and C is a targeted upper limit for maximum contrast of an optical radiation field speckle-pattern at the output of the multimode fiber.

4. A method in accordance with claim 3, wherein the parameters of the optical radiation and of the multimode fiber are selected to also satisfy the following expression:

$$L \cdot \Delta v > (N-1) \cdot \frac{V^2}{\Delta V}.$$

5. A method in accordance with claim 1, wherein the step of applying comprises processing the modulated optical radiation so as to have an angular spectrum width $\Delta\theta$ at the input of the multimode optical fiber, the angular spectrum width $\Delta\theta$ substantially exceeding the diffraction limit angle corresponding to the diameter of the multimode fiber.

6. A method in accordance with claim 1, wherein the step of transmitting the modulated optical radiation comprises:

coupling the modulated optical radiation from the output of the multimode fiber to an optical antenna;

concentrating the modulated optical radiation from the output of the multimode fiber by the optical antenna; and radiating the concentrated optical radiation as a beam over the free-space optical link.

7. A free-space optical communication system, comprising:

a source of optical radiation having a frequency spectrum width $\Delta v$;

a modulator for receiving an information signal of a predetermined bandwidth $\delta v$, and for causing the optical radiation to be modulated with the information signal;

a multimode optical fiber;

an optical processing element for receiving the modulated optical radiation and coupling the modulated optical radiation to an input of the multimode optical fiber in such a manner as to excite substantially all possible modes for the optical radiation supported by the multimode fiber;

wherein the parameters of the optical radiation and of the multimode fiber are selected to satisfy the following expressions;

$$L \cdot \Delta v > \frac{V^2}{\Delta V}$$

and $$L \cdot \delta v < \frac{V^2}{\Delta V}$$

where:

L is the multimode fiber length;

$\Delta v$ is the frequency spectrum width of the optical radiation;

$\delta v$ is the modulation signal frequency bandwidth;

V is mean velocity of the optical radiation modes propagating along the fiber; and $\Delta V$ is maximum difference between propagation velocities of the modes exited by the radiation in the fiber; and an optical antenna coupled to receive radiant energy from an output of the multimode fiber, concentrate the received radiant energy, and transmit the concentrated radiant energy over a free-space optical link.

8. A system in accordance with claim 7, wherein the source of the optical radiation comprises at least one laser, the at least one laser producing optical radiation comprising a plurality separate spectral lines with minimum spacing between them, exceeding δv.

9. A system in accordance with claim 8, wherein the plurality separate spectral lines includes a number N of spectral lines, and an angular spectrum width Δθ of the modulated optical radiation at the input of the multimode optical fiber provides excitation of a number A of fiber modes, and N and A are selected to satisfy the following expression:

$$\frac{A+N-1}{A \cdot N} \leq C^2$$

where N is the number of the radiation spectrum lines;
A is the number of modes excited in the fiber at each of the spectrum lines; and
C is a targeted upper limit for maximum contrast of an optical radiation field speckle-pattern at the output of the multimode fiber.

10. A system in accordance with claim 9, wherein the parameters of the optical radiation and of the multimode fiber are selected to satisfy the following expression:

$$L \cdot \Delta v > (N-1) \cdot \frac{V^2}{\Delta V}.$$

11. A system for as in claim 7, wherein the optical processing element is configured such that it couples the modulated optical radiation to the input of the multimode optical fiber with an angular spectrum width substantially meeting or exceeding the diffraction limit angle corresponding to the diameter of the multimode fiber.

* * * * *